US011228506B2

(12) United States Patent
Zackariya et al.

(10) Patent No.: US 11,228,506 B2
(45) Date of Patent: Jan. 18, 2022

(54) SYSTEMS AND METHODS FOR DETECTING ANOMALIES IN PERFORMANCE INDICATORS OF NETWORK DEVICES

(71) Applicant: HEWLETT PACKARD ENTERPRISE DEVELOPMENT LP, Houston, TX (US)

(72) Inventors: Firdousi Farozan Zackariya, Tamil Nadu (IN); Vimal Dinakaran, Tamil Nadu (IN); Saravanan Kalirajan, Tamil Nadu (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 516 days.

(21) Appl. No.: 16/123,081

(22) Filed: Sep. 6, 2018

(65) Prior Publication Data

US 2020/0084119 A1 Mar. 12, 2020

(51) Int. Cl.
*H04L 12/24* (2006.01)
*G06F 9/54* (2006.01)
(Continued)

(52) U.S. Cl.
CPC .......... *H04L 41/5009* (2013.01); *G06F 9/542* (2013.01); *G06F 9/546* (2013.01);
(Continued)

(58) Field of Classification Search
CPC . H04L 41/50–41/5035; H04L 41/06–41/0631; G06F 16/2455–16/2477; G06F 9/542–9/546
See application file for complete search history.

(56) References Cited

U.S. PATENT DOCUMENTS 7,092,707 B2 8/2006 Lau et al.
8,255,524 B2 8/2012 Devitt
(Continued)

FOREIGN PATENT DOCUMENTS

EP 2894813 A1 7/2015
WO WO-WO0221774 A1 3/2002

OTHER PUBLICATIONS

Bodrog et al, A Robust Algorithm for Anomaly Detection in Mobile Networks, 2016 IEEE 27th Annual International Symposium on Personal, Indoor, and Mobile Radio Communications (PIMRC): Workshop: 6th International Workshop on Self-Organizing Networks (IWSON), Dec. 22. 2016, 6 Pgs.
(Continued)

*Primary Examiner* — Clayton R Williams
(74) *Attorney, Agent, or Firm* — Hewlett Packard Enterprise Patent Department

(57) ABSTRACT

Systems and methods are provided for detecting an anomaly in a performance indicator associated with a network device. One method may include: generating a plurality of hints; identifying a subset of hints from the plurality of hints, where each hint in the subset is associated with an open alert and has a same severity level as the associated open alert; querying in bulk from a time series data store a set of historical data; processing the set of historical data and the remaining hints that are not in the subset of hints to form processed data; determining whether the processed data exceeds a threshold parameter associated with the performance indicator; and performing an alert action in bulk based on the processed data exceeding the threshold parameter of the performance indicator.

20 Claims, 5 Drawing Sheets

(51) Int. Cl.
*H04L 12/26* (2006.01)
*G06F 16/2458* (2019.01)

(52) U.S. Cl.
CPC ...... *G06F 16/2477* (2019.01); *H04L 41/0631* (2013.01); *H04L 41/5035* (2013.01); *H04L 43/16* (2013.01)

(56) References Cited

U.S. PATENT DOCUMENTS

| | | | |
|---|---|---|---|
| 10,146,609 B1 * | 12/2018 | Leverich | G06F 11/079 |
| 2016/0087856 A1 | 3/2016 | Groenendijk et al. | |
| 2016/0088502 A1 | 3/2016 | Sanneck et al. | |
| 2017/0052536 A1 * | 2/2017 | Warner | G06Q 50/06 |
| 2017/0083015 A1 * | 3/2017 | Erickson | G05B 23/0254 |
| 2017/0124502 A1 | 5/2017 | Brew et al. | |
| 2017/0201897 A1 * | 7/2017 | Yang | H04W 24/04 |
| 2017/0230846 A1 * | 8/2017 | Wang | H04W 24/04 |

OTHER PUBLICATIONS

Cretu-Ciocarlie G. et al, Detecting Anomalies in Cellular Networks Using an Ensemble Method, 9th CNSM and Workshops, 2013 IFIP, 4 Pgs.

* cited by examiner

SYSTEMS AND METHODS FOR DETECTING ANOMALIES IN PERFORMANCE INDICATORS OF NETWORK DEVICES

BACKGROUND

Monitoring the performance of a computing system allows for the optimization of the computing system in terms of metrics, such as costs, reliability, and efficiency. The performance of the computing system may be evaluated by the monitoring of certain performance indicators commonly referred to as "key performance indicators (KPIs)." Key performance indicators (KPIs) may vary based on the computing system, and may include, for example, port usage, channel utilization, input/output error rates, etc., in instances in which the computing system is included as part of a network. Detecting anomalies in the key performance indicators (KPIs) may be useful in alerting administrators or other users of the computing system to deficiencies in the performance of the computing system.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for purposes of discussion.

DETAILED DESCRIPTION

Figure 1:
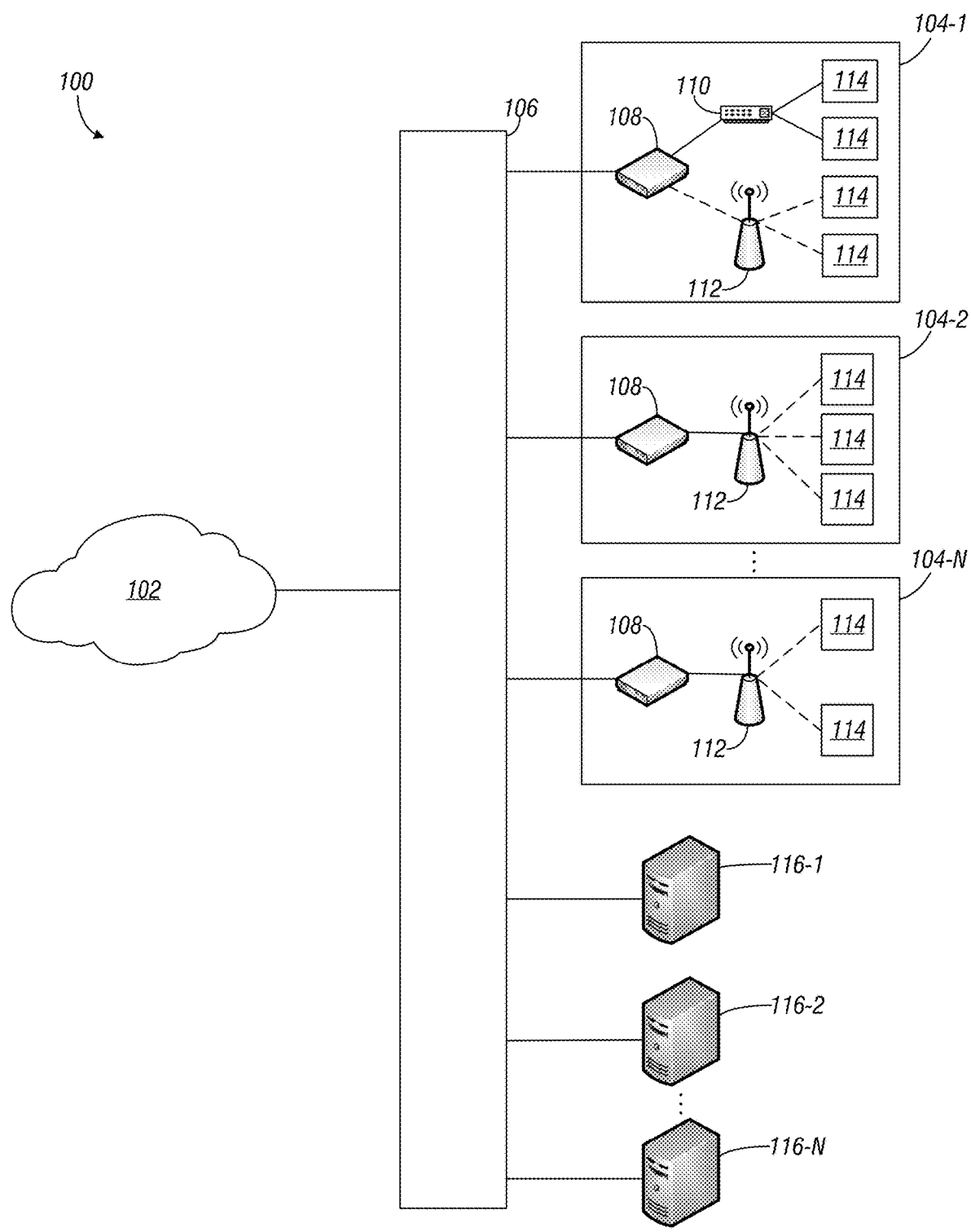
FIG. 1 is a block diagram of an example network environment including at least a notification system, according to one or more examples of the disclosure.

Illustrative examples of the subject matter claimed below will now be disclosed. Not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Certain performance indicators of computing systems may be monitored and evaluated to determine the performance of the computing system and the components thereof. These performance indicators, commonly referred to as "key performance indicators", may vary based on the computing system. For example, in instances in which the computing system is part of a network, the key performance indicators may include, for instance, port usage, channel utilization, input/output error rates, etc. In a network setting, the key performance indicators may be indicative of the performance of the overall network and/or the performance of one or more network devices forming part of the network. Anomalies detected in the key performance indicators through the monitoring and evaluation of the key performance indicators may be indicative of a deficiency in the performance of the network or a network device thereof, and thus, may be used to alert administrators or other users of the computing system to deficiencies in the performance of the computing system. Corrective action may then be taken to resolve any performance deficiency and to optimize the performance of the network.

Generally, to detect anomalies in the key performance indicators, a system user, such as a network administrator, may assign a threshold parameter to each key performance indicator. A key performance indicator received from a component of the computing system may be compared to the respective threshold parameter and an alert, or notification, may be generated if the key performance indicator exceeds (or, alternatively, does not meet) the respective threshold parameter.

Continuously comparing each of the key performance indicators to an assigned threshold parameter as the key performance indicators are received may be effective in determining anomalies; however, such an approach adds stress to the core infrastructure services of the computing system. In addition, such implementations increase costs, as additional processing resources are typically allocated to the continuous comparison of the received key performance indicators to the respective threshold parameters. To reduce costs and relieve stress on the core infrastructure, a schedule may be implemented. For example, a process to detect anomalies may be run every hour instead of continuously; however, the foregoing results in the delay of the detection of any anomalies and the generation of any notifications regarding the same. Such a delay may allow for undesirable performance of the computing system to persist for a timeframe sufficient to permit damage or disruption to the computing system.

Examples of the present disclosure are directed to a notification system in which a notification, or alert, is generated based on an anomaly detected in a key performance indicator. The anomaly may occur when a key performance indicator exceeds (or, in the alternative, does not meet) a threshold parameter associated with the key performance indicator for a predetermined duration. In one or more examples, to detect the anomaly, a plurality of hints may be generated from a comparison of the performance indicators to the respective threshold parameter assigned thereto. The hints may be published to a messaging queue and retrieved by a streaming engine. The hints may be run with a micro batch in a streaming job via the streaming engine and filtered to remove any hints identical to open alerts having an identical severity level. The remaining hints may be processed with queried historical data from a time series data store to form a set of processed data, where the queried historical data is based on the predetermined duration associated with the threshold parameter. The processed data is then compared to the threshold parameter and based on the comparison, a new alert may be created, or a pending alert may be updated, in bulk, indicative of an anomaly. The alert may be presented to the user or administrator of the network device or network generating the key performance indicator in which the anomaly was detected.

More particularly, in one example of the present disclosure, a computer-implemented method is provided and may include generating a plurality of hints. Each hint may result from an instance of the performance indicator exceeding a threshold parameter during a duration associated with the threshold parameter. Each hint may include a plurality of parameters including at least a severity level. The computer-implemented method may also include identifying a subset of hints from the plurality of hints, where each hint in the subset is associated with an open alert and has a same severity level as the associated open alert. The computer-implemented method may further include querying in bulk from a time series data store a set of historical data stored during the duration, and processing the historical data and remaining hints that are not in the subset of hints to form a first set of processed data. The computer-implemented method may also include determining whether the first set of processed data exceeds the threshold parameter associated with the performance indicator, and performing an alert action in bulk based on the processed data exceeding the threshold parameter of the performance indicator, the alert action indicative of a detection of the anomaly in the performance indicator.

In another example of the present disclosure, a computing system is provided and includes a network device, a memory, and one or more processors, communicatively coupled to the memory and the network device. The memory stores instructions, that when executed by the one or more processors, cause the one or more processors to: generate a plurality of hints, each hint resulting from an instance of performance indicator of the network device exceeding a threshold parameter during a duration associated with the threshold parameter, and each hint including a plurality of parameters including at least a severity level; identify a subset of hints from the plurality of hints, where each hint in the subset is associated with an open alert and has a same severity level as the associated open alert; query in bulk from a time series data store a set of historical data during the duration; process the set of historical data and remaining hints that are not in the subset of hints to form a first set of processed data; determine whether the first set of processed data exceeds the threshold parameter associated with the performance indicator; and perform an alert action in bulk based on the first set of processed data exceeding the threshold parameter of the performance indicator, the alert action indicative of a detection of the anomaly in the performance indicator.

In another example of the present disclosure, a non-transitory computer-readable medium is provided and stores computer-executable instructions, which when executed, cause a computer to: generate a plurality of hints, each hint resulting from an instance of performance indicator of the network device exceeding a threshold parameter during a duration associated with the threshold parameter, and each hint including a plurality of parameters including at least a severity level; identify a subset of hints from the plurality of hints, where each hint in the subset is associated with an open alert and has a same severity level as the associated open alert; query in bulk from a time series data store a set of historical data during the duration; process the set of historical data and remaining hints that are not in the subset of hints to form a set of processed data; determine whether the set of processed data exceeds the threshold parameter associated with the performance indicator; and perform an alert action in bulk based on the set of processed data exceeding the threshold parameter of the performance indicator, the alert action indicative of a detection of the anomaly in the performance indicator.

Turning now to the drawings, FIG. 1 is a block diagram of an example network environment 100 including a notification system 102, according to one or more examples of the disclosure. The network environment 100 may be implemented for multiple entities and may include a plurality of sites 104-1 through 104-N (also referred to collectively as sites 104 or individually and generally as a site 104) associated with the entities. Each of the sites 104 may be in communication with the notification system 102 via a network 106.

Each of the sites 104 may be located in a different physical or geographical location from one another and may be associated with the same entity, or in another example, different entities. Each site 104 may include a plurality of network devices for communicating with the network 106. For example, as illustrated in FIG. 1, each site 104 may include a gateway device 108 for communicating with the network 106. The gateway device 108 may be a router, a digital-to-analog modem, a cable modem, a Digital Subscriber Line (DSL) modem, or some other network device configured to communicate with the network 106. Each site 104 may also include one or more switches 110, routers (not shown), hubs (not shown), and/or access points 112 in communication with the gateway device 108 over either wired or wireless connections. The switches 110, routers, hubs, and access points 112 provide connectivity to the network 106 for various client devices 114 (four shown at site 104-1, three shown at site 104-2, and two shown at site 104-N).

The network environment 100 may also include a plurality of content servers 116-1 through 116-N (also referred to collectively as content servers 116 or individually and generally as a content server 116). The client devices 114 may request and access data and content provided by the content servers 116 over their connection to the network 106. The content servers 116 may include multimedia downloadable and/or streaming content, including audio, video, graphical, and/or text content, or any combination thereof. In one example, one or more of the content servers 116 may be a web server. The client devices 114 may request and access the multimedia content provided by the content servers 116.

The notification system 102 may be communicatively coupled to each of the sites 104 (and the network devices thereof) and the content servers 116 via the network 106. In the example illustrated in FIG. 1, the notification system 102 may be cloud based. In some examples, the notification system 102 may be running on a server (not shown) located at one of the sites 104. In other examples, the notification system 102 may be running on a server (not shown) located in a different physical or geographical location from the sites 104 and the content servers 116 or may be distributed across any number of servers (not shown) local or remote to the sites 104 and the content servers 116.

The network 106 may be a private network, or the network 106 may be a public network, such as the Internet. As used herein, a public network is a network that may be shared by any number of entities, including the illustrated network environment 100. A public network may have unrestricted access, such that any user may connect to it. The network 106 may include any number of intermediate network devices, such as switches, routers, gateways, servers, and/or controllers, that are not directly illustrated as part of the network environment 100 but that facilitate communication between the various parts of the network environment 100, and between the network environment 100 and other network-connected entities.

Figure 2:
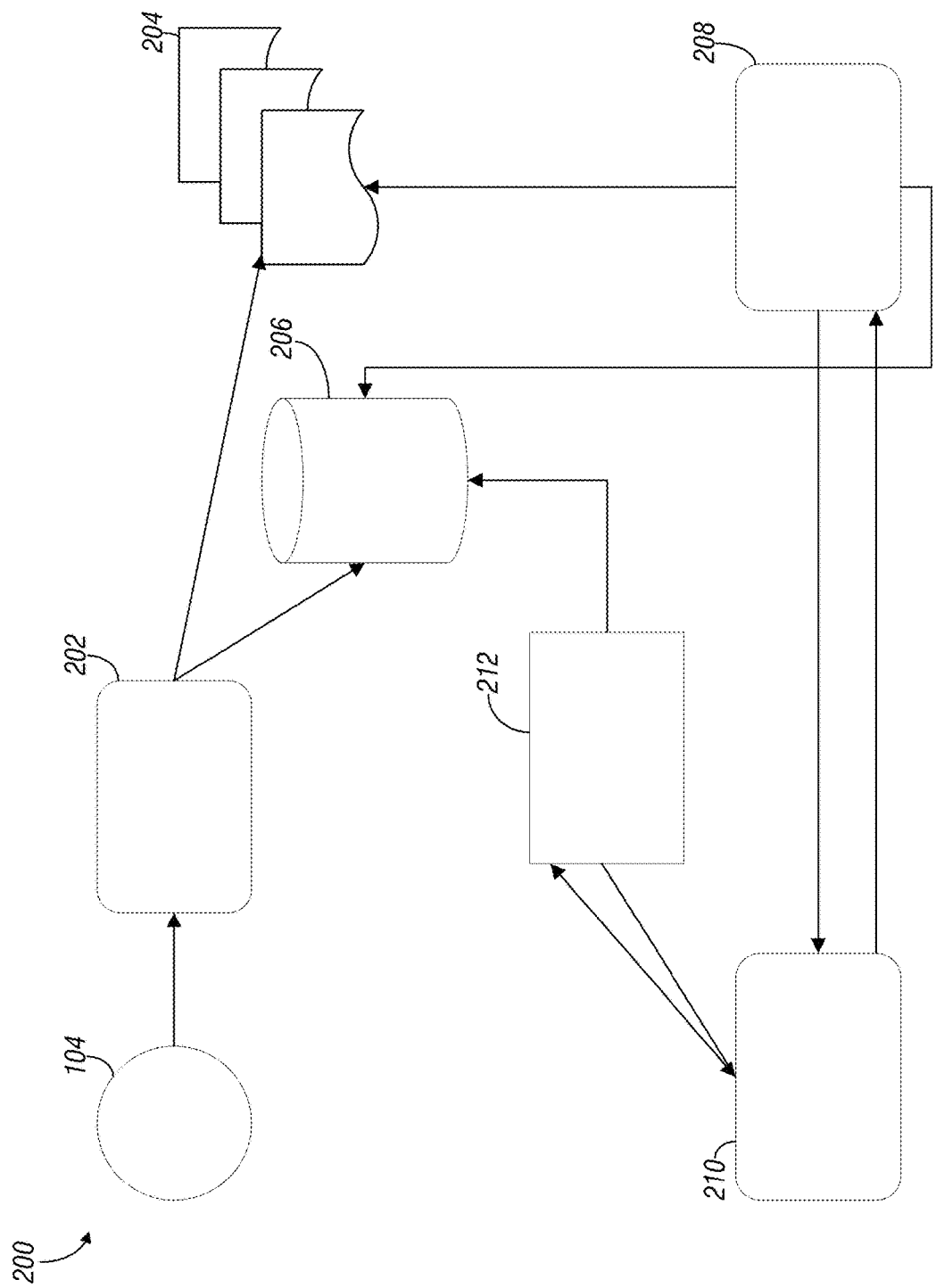
FIG. 2 is a block diagram of an example notification system suitable for use in the network environment of FIG. 1, according to one or more examples of the disclosure.

Referring now to FIG. 2 with continued reference to FIG. 1, FIG. 2 is a block diagram of an example notification system 200 suitable for use in the network environment 100 of FIG. 1, according to one or more examples of the present disclosure. The notification system 200 may be an example of the notification system 102, and thus may be used in place of the notification system 102 in the network environment 100 of FIG. 1. Similar to the notification system 102, the notification system 200 may be cloud based. In other examples, the notification system 200 may run on a server (not shown) located in a different physical or geographical location from the sites 104 and the content servers 116 or may be distributed across any number of servers (not shown) local or remote to the sites 104 and the content servers 116.

The notification system 200 may include a monitoring engine 202 communicatively coupled to the network devices of the sites 104 and the content servers 116. For example, each gateway device 108 of each site 104 and each content server 116, all shown in FIG. 1, may be communicatively coupled to the monitoring engine 202. In one or more examples, the monitoring engine 202 may include a set of instructions (e.g., software—see FIG. 3, 304) stored in memory (e.g., FIG. 3, 302) and executable by a processor (e.g., hardware—see FIG. 3, 300). In other examples, the monitoring engine 202 may be any combination of hardware and software to implement the functionalities of the monitoring engine 202. In examples described herein, such combinations of hardware and software may be implemented in a number of different ways. For example, the software for the monitoring engine 202 may be processor executable instructions (e.g., FIG. 3, 304) stored on at least one non-transitory machine-readable storage medium (e.g., FIG. 3, 302) and the hardware for the monitoring engine 202 may include at least one processing resource (e.g., FIG. 3, 300) to execute those instructions. In some examples, the hardware may also include other electronic circuitry to at least partially implement the monitoring engine 202. In some examples, the at least one machine-readable storage medium may store instructions that, when executed by the at least one processing resource, at least partially implement some or all of the monitoring engine 202. In such examples, a computing device may include the at least one machine-readable storage medium storing the instructions and the at least one processing resource to execute the instructions. In other examples, the monitoring engine 202 may be implemented by electronic circuitry.

Each of the network devices (e.g., gateway devices 108, switches 110, and access points 112), of the sites 104 and the content servers 116 may transmit performance indicators over the network 106 to the monitoring engine 202. The performance indicators may be interchangeably referred to herein as "key performance indicators" and may be indicative of the performance of the particular network device sending the performance indicators and/or the performance of the portion of the network 106 communicatively coupled to the particular network device sending the performance indicators. For example, performance indicators sent by the access points 112 may be transmitted to the monitoring device 202 via the respective gateway device 108 and thus may be indicative of the performance of the access points 112 and/or the gateway device 108.

The performance indicators may vary in form and kind based on the network device. For example, the performance indicators associated with each of the access points 112, gateway devices 108, and switches 110 may be CPU or memory utilization, whereas performance indicators associated solely with access points 112 may be radio noise floor or channel utilization. Additionally, performance indicators associated with switches 110 may be switch interface in/out usage, in/out error rates, and/or jitter/latency/usage on uplinks. In any event, the performance indicators may be transmitted by the network devices in a format readable by the monitoring engine 202, or the monitoring engine 202 may convert the performance indicators received by the network devices to a format readable by the monitoring engine 202.

The monitoring engine 202 may be programmed or otherwise configured to include one or more threshold parameters associated with a respective performance indicator. Each threshold parameter may be a default threshold parameter set by the administrator of the notification system 200, or one or more of the threshold parameters may be established by the network administrators for each network device at the respective site 104. Each threshold parameter may include a severity level associated therewith. The severity levels may take various forms and, in one example, may be descriptive terms such as "critical", "major", "minor", etc.

Accordingly, in one example of the present disclosure, a performance indicator of an access point 112 may be the radio channel utilization thereof. A threshold parameter associated with the "radio channel utilization" performance indicator may be "greater than 90%" and a severity level associated with this threshold parameter may be "critical." In another example, another threshold parameter of the "radio channel utilization" performance indicator of the access point 112 may be "greater than 80%" and a severity level associated therewith may be "major."

In addition to the severity level, each of the threshold parameters may include a duration associated therewith. For example, with respect to the "radio channel utilization" performance indicator of the access point 112, the duration may be twenty minutes. However, it will be appreciated that the duration may vary depending on the performance indicator and/or the preference of the administrator establishing the threshold parameter. In one or more examples, the duration represents a time period selected to evaluate the received instances of the performance indicator to determine if an alert is to be issued or updated, as discussed in more detail below. The implementation of a duration may avoid the issuance of an alert based on a single aberration in the performance indicator monitored.

Each of the threshold parameters may be configured as a maximum or a minimum parameter. To that end, the performance indicators received by the monitoring engine 202 via the network 106 are compared to the respective threshold parameters associated with the performance indicators and a hint is generated for each instance a performance indicator exceeds (or, in the alternative, does not meet) the associated threshold parameter during the duration associated therewith. For example, if the performance indicator received is a radio channel utilization of 85%, and the threshold parameter of the "radio channel utilization" performance indicator of the access point 112 is "greater than 80%" and a severity level associated therewith is "major", then a hint is generated in the monitoring engine 202 including a radio channel utilization having a value of 85% and a severity level of "major." Accordingly, as seen from the example, a hint as described herein includes the performance indicator and the value thereof and the severity level associated with the performance indicator in view of the threshold parameter. Thus, the generated hints provide a filtered result of occurrences in the performance indicators that may be indicative of anomalies. The monitoring engine 202 may publish or otherwise transmit each hint generated in the monitoring engine 202 to a messaging queue 204. The monitoring engine 202 may also transmit in parallel the entirety of the performance indicators received from the respective network devices to a time series data store 206, as shown in FIG. 1.

The notification system may include a streaming engine 208 communicatively coupled to an alert engine 210 and each of the time series data store 206 and the messaging queue 204. In one or more examples, the streaming engine 208 and the alert engine 210 may each include a set of instructions (e.g., software) stored in memory and executable by a processor (e.g., hardware). In other examples, the streaming engine 208 and the alert engine 210 may each be any combination of hardware and software to implement the functionalities of the streaming engine 208. In examples described herein, such combinations of hardware and software may be implemented in a number of different ways. For example, the software for each of the streaming engine 208 and the alert engine 210 may be processor executable instructions (e.g., FIG. 3, 304) stored on at least one non-transitory machine-readable storage medium (e.g., FIG. 3, 302), and the hardware for each of the streaming engine 208 and the alert engine 210 may include at least one processing resource (e.g., FIG. 3, 300) to execute those instructions.

In some examples, the hardware for the streaming engine 208 may also include other electronic circuitry to at least partially implement the streaming engine 208, and the hardware for the alert engine 210 may also include other electronic circuitry to at least partially implement the alert engine 210. In some examples, the at least one machine-readable storage medium may store instructions that, when executed by the at least one processing resource, at least partially implement some or all of the streaming engine 208, and the at least one machine-readable storage medium may store instructions that, when executed by the at least one processing resource, at least partially implement some or all of the alert engine 210. In such examples, a computing device may include the at least one machine-readable storage medium storing the instructions and the at least one processing resource to execute the instructions. In other examples, the streaming engine 208 and the alert engine 210 may each be implemented by electronic circuitry.

The streaming engine 208 may include a streaming job with micro batches. Accordingly, in one or more examples, the streaming job may run every thirty seconds to operate on all of the performance indicators received in that micro batch. In another example, the streaming job may run every minute to operate on all of the performance indicators received in that micro batch. In operation, the streaming job retrieves each hint from the messaging queue 204 periodically (e.g., every thirty seconds or every minute) and runs as set forth below.

After retrieving each of the hints from the messaging queue 204 in the micro batch, the hints may be distributed across any number of nodes in the notification system 200 to parallelize detection. As used herein, the term "nodes" may refer to any network device or computing component of the computing system 100 defining communication paths for the sharing of data. The distribution of the hints across nodes aids in limiting the number of object queries in the underlying data stores of the nodes and improves the efficiency of the operation of the notification system 200. By doing so, each node does not check the time series data store 206 for each hint in a separate query. The streaming engine 208 may compare the retrieved hints to open alerts (i.e., alerts previously generated and currently pending) stored in the alert engine 210 and filter out any hints identical to the open alerts and having an identical severity level. Accordingly, the streaming engine 208 in conjunction with the alert engine 210 perform a further filtering of the performance indicators received from the network 106. Such filtering may reduce the number of queries to the time series data store 206.

In one example of the filtering by the streaming engine 208 in conjunction with the alert engine 210, an alert is to be generated if memory of an access point associated with Site A crosses 80% for more than 15 mins. Performance indicators were detected to be greater than the aforementioned threshold parameter for the duration. Accordingly, an alert was generated and is considered open. The steaming engine 208 may receive a hint including performance indicator that raised the open alert (memory of an access point associated with Site A crosses 80%). Accordingly, in the example provided, the hint will be filtered out and no query of the historical data for that hint will occur, thereby reducing the number of queries to the time series data store 206 and conserving computing resources.

With respect to the remaining hints (i.e., those hints remaining after filtering), the streaming job queries in bulk from the time series data store 206 the historical data associated with the performance indicators in the hints. The historical data may be provided from the performance indicators transmitted to the time series data store 206 by the monitoring engine 202 and stored therein for the duration associated with the threshold parameter. For example, if the duration associated with the threshold parameter is twenty minutes, the queried historical data will include the related performance indicators values received within the previous twenty minutes, because the performance indicator values received beyond the previous twenty minutes are no longer stored in the time series data store.

The remaining hints and the set of queried historical data are processed to form a set of processed data. In one example, the set of processed data may be formed by averaging the performance indicator values of the remaining hints and the queried historical data. In another example, the set of processed data may be formed by determining a total value of the queried historical data and the remaining hints. In yet another example, the set of processed data may be formed by determining a maximum value of the queried historical data and the remaining hints.

The set of processed data may be compared to the threshold parameter associated with the performance indicator and based on the comparison, a new alert or an update to an open alert indicative of an anomaly in the performance indicator may be generated in bulk and transmitted to the alert engine 210. For example, if an alert was previously generated and is still open for a "radio channel utilization" performance indicator of the access point 112 being "greater than 80%" and a severity level associated therewith is "major", then if the set of processed data exceeds a threshold parameter associated with a severity level of "critical", then the alert may be updated to change the severity level from "major" to "critical." In an instance in which the threshold parameter is changed by the network administrator for a particular device after the alert was previously generated, a bit value may set on an open alert to indicate that a threshold parameter has been changed to ensure an alert is updated accordingly.

As provided herein, an alert may be a visual or audio communication to a user or administrator of the network device from which the anomaly in the performance indicator has been detected. The alert may be transmitted to the user or administrator via a display dashboard on a serial console or other computing device, a text message, an email, or any other suitable communication method. The alert may include a description of the key performance indicator, a condition of the key performance indicator, such as the threshold parameter exceeded (or, in the alternative, not met) and the associated duration and severity level, time/date of the generation of the alert, and for closed alerts, the time/date of the closing of the alert.

The generated alerts may be monitored and evaluated to determine if the alert is updated and currently applicable. To that end, the alert engine 210 may include an automatic closing job 212 (illustrated separately from the alert engine 208 in FIG. 2 so as to not obfuscate the present disclosure) to run periodically on all open alerts in the alert engine 210. Accordingly, in one or more examples, the automatic closing job 212 may run every thirty minutes to operate on all open alerts in the alert engine 210. In another example, the automatic closing job 212 may run every hour to operate on all open alerts in the alert engine 210.

In operation, the automatic closing job queries all open alerts periodically (e.g., every thirty minutes or every hour) in the alert engine 210 and additionally queries the historical data from the time series data store 206 for any open alerts. The queried historical data is processed in any manner set forth above to form a second set of processed data. The automatic closing job compares the threshold parameters associated with the open alerts to the second set of processed data. Based on the comparison, any open alert that is no longer applicable may be closed in bulk to reduce the number of calls. A communication may be generated and sent to the network administrator of the network device associated with the alert to indicate that the alert has been closed.

Figure 3:
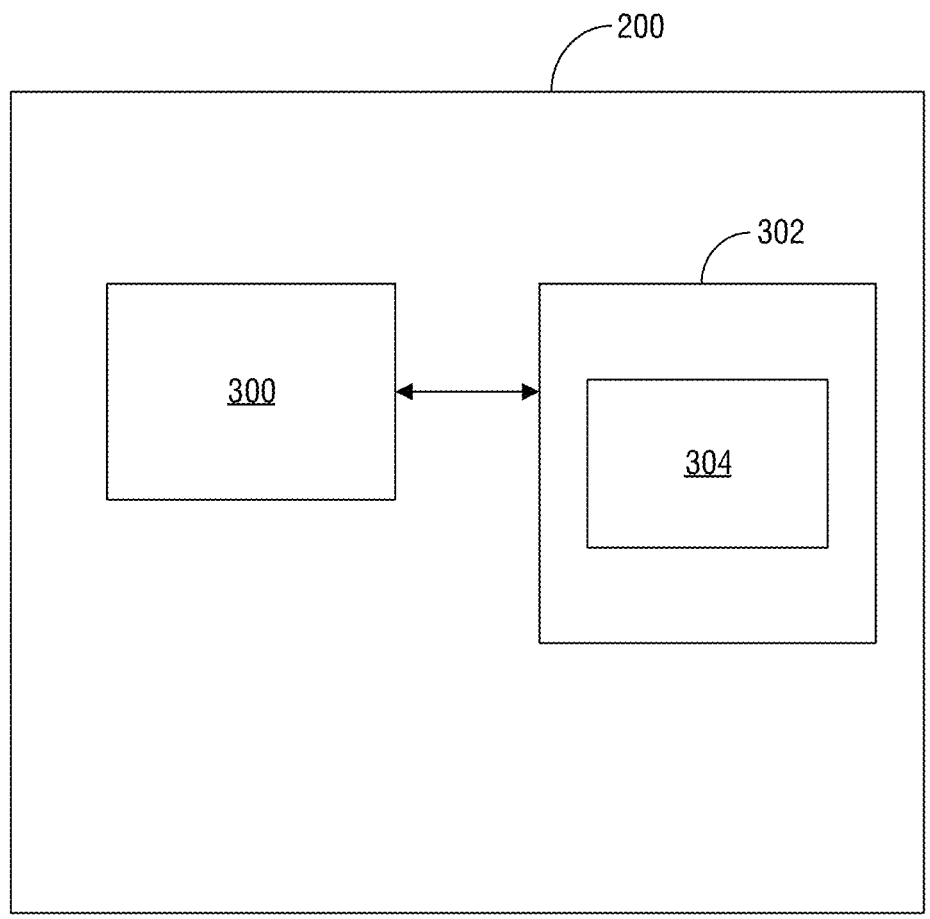
FIG. 3 is a block diagram of a processor communicatively coupled to a non-transitory computer-readable medium, according to one or more examples of the disclosure.

Turning now to FIG. 3 with continued reference to FIGS. 1 and 2, the notification system 200 of the present disclosure may include one or more processors 300 (one shown) and a non-transitory computer-readable medium 302 storing instructions 304 that when executed by the processor 300 provide for: the generation of a plurality of hints; filtering any hint from the plurality of hints that is associated with any open alert and has a severity level identical to a severity level of the pending alert; querying in bulk from a time series data store the historical data for the remaining (i.e., non-filtered) hints; processing the historical data and remaining hints to form a first set of processed data; determining whether the first set of processed data exceeds a threshold parameter associated with the respective performance indicator; and creating a new alert, or modifying an open alert, in bulk based on the first set of processed data exceeding the threshold parameter of the performance indicator, the new alert or the modified open alert indicative of a detection of the anomaly in the performance indicator with the performance indicator, thereby detecting the anomaly in the performance indicator.

To that end, the processor(s) 300 may be integrated in a single component of the notification system 200 or distributed across components thereof. The non-transitory computer-readable storage medium 302 may be integrated in the same component as the processor(s) 300, or the non-transitory computer-readable storage medium 302 may be separate but accessible to that component and the processor(s) 300. In an example, the non-transitory computer-readable storage medium 302, the processor(s) 300, or a combination thereof, may be implemented in any of the components of the notification system 200. Alternatively, or in addition, the non-transitory computer-readable storage medium 302 and the processor(s) 300 may be implemented in a controller connected to the monitoring engine 202, the streaming engine 208, and the alert engine 210, and that controls the functionalities and operation of the monitoring engine 202, the streaming engine 208, and the alert engine 210.

In one example, the stored instructions 304 can be part of an installation package that when installed can be executed by the processor(s) 300 to implement the notification system 200. In this case, the non-transitory computer-readable storage medium 302 may be a portable medium such as a CD, DVD, or flash drive or a memory maintained by a server from which the installation package can be downloaded, or installed. In another example, the stored instructions 304 may be part of an application or applications already installed. Here, the non-transitory computer-readable storage medium 302 can include integrated memory such as hard drive, solid state drive, and the like.

Figure 4:
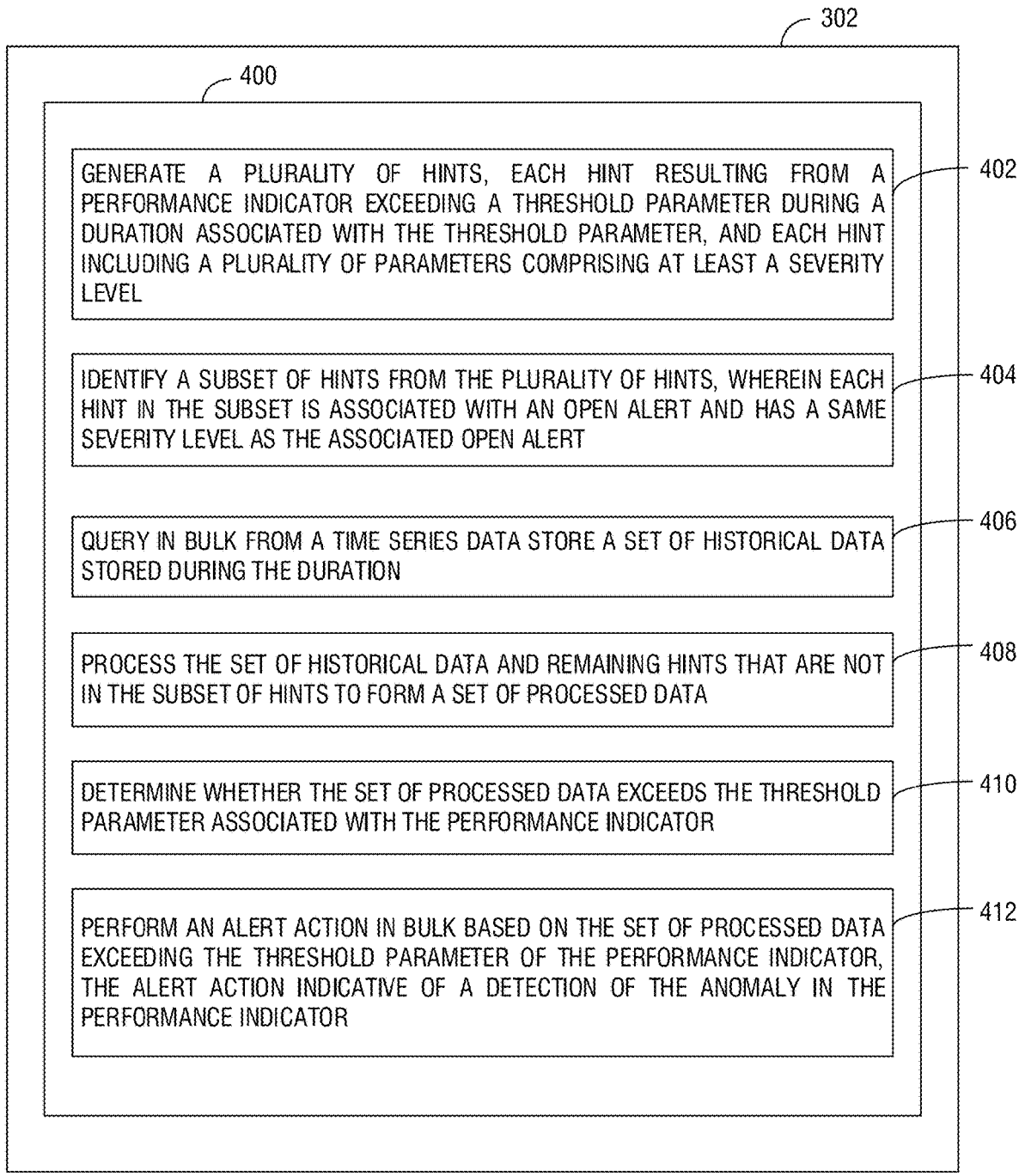
FIG. 4 is a block diagram of example instructions stored on the non-transitory computer-readable medium of FIG. 3, according to one or more examples of the disclosure.

FIG. 4 is a block diagram of example instructions 400 stored on the non-transitory computer-readable medium 302 of FIG. 3, according to one or more examples of the disclosure. The processor 300 and the implementation of the notification system 200 via the execution of the instructions 400 stored on the non-transitory computer-readable storage medium 302 may now be discussed in the context of FIGS. 1 and 2. The implementation begins with the generation of a plurality of hints, as at instruction block 402. Each hint may result from an instance of the performance indicator exceeding a threshold parameter during a duration associated with the threshold parameter. Each hint may include a plurality of parameters including at least a severity level.

As at instruction block 404, the non-transitory computer-readable storage medium 302 may include instructions executable by the processor 300 to identify a subset of hints from the plurality of hints, where each hint in the subset is associated with an open alert and has a same severity level as the associated open alert. As at instruction block 406, the non-transitory computer-readable storage medium 302 may include instructions executable by the processor 300 to query in bulk from a time series data store 206 a set of historical data stored during the duration. As at instruction block 408, the non-transitory computer-readable storage medium 302 may include instructions executable by the processor 300 to process the set of historical data and remaining hints that are not in the subset of hints to form processed data.

As at instruction block 410, the non-transitory computer-readable storage medium 302 may include instructions executable by the processor 300 to determine whether the set of processed data exceeds the threshold parameter associated with the performance indicator. As at instruction block 412, the non-transitory computer-readable storage medium 302 may include instructions executable by the processor 300 to perform an alert action in bulk based on the processed data exceeding the threshold parameter of the performance indicator, the alert action indicative of a detection of the anomaly in the performance indicator.

Figure 5:
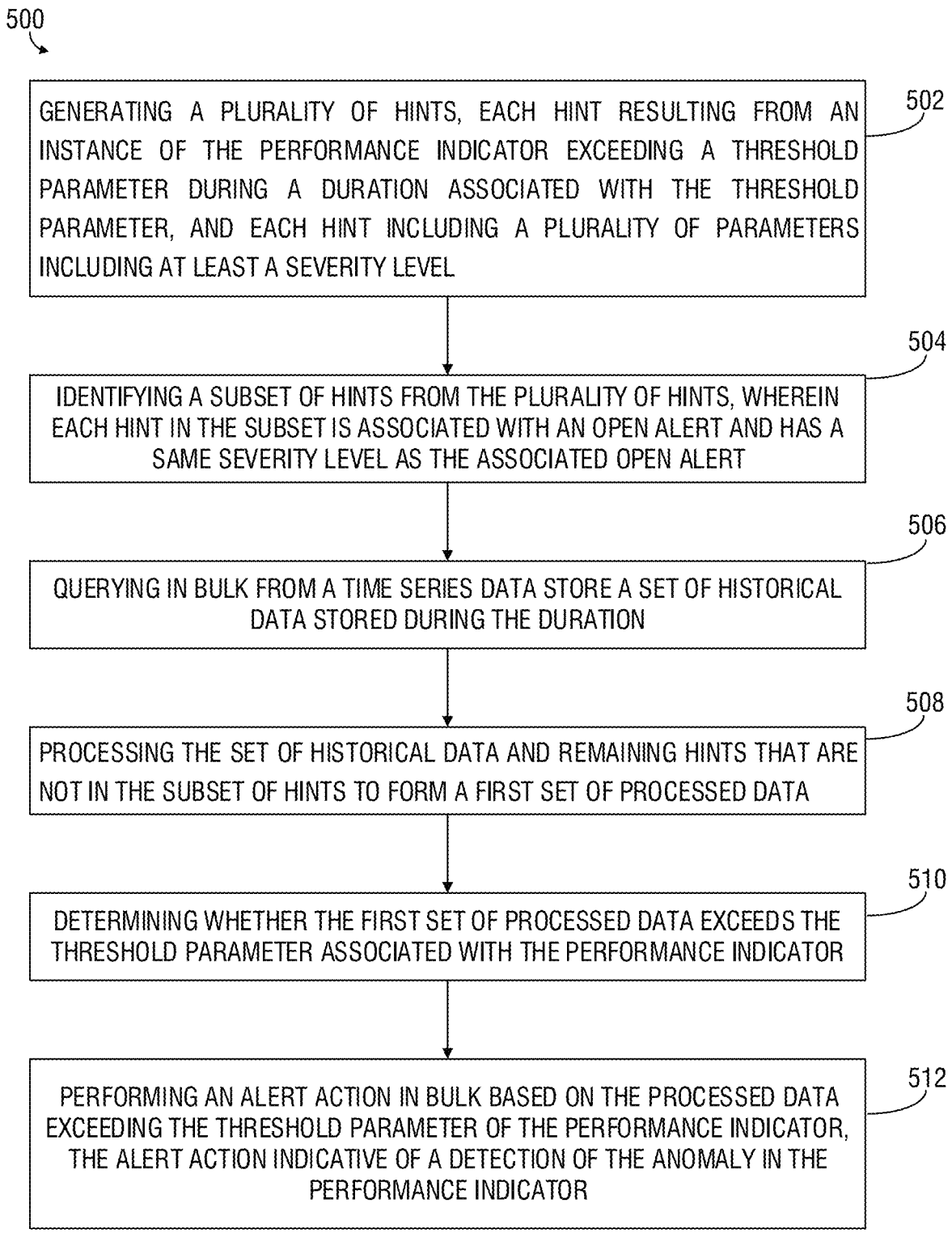
FIG. 5 is a flowchart depicting a computer-implemented method for detecting an anomaly in a plurality of performance indicators associated with a network device, according to one or more examples of the disclosure.

FIG. 5 is a flowchart depicting a computer-implemented method 500 for detecting an anomaly in a plurality of performance indicators associated with a network device, according to one or more examples of the disclosure. In discussing FIG. 5, reference is made to the block diagrams of FIGS. 1-4 to provide contextual examples. Implementation, however, is not limited to those examples.

As shown in FIG. 5, the computer-implemented method 500 may start at block 502 and may include generating a plurality of hints. Each hint may result from an instance of the performance indicator exceeding a threshold parameter during a duration associated with the threshold parameter. Each hint may include a plurality of parameters including at least a severity level. As at block 504, the computer-implemented method 500 may also include identifying a subset of hints from the plurality of hints, where each hint in the subset is associated with an open alert and has a same severity level as the associated open alert. The computer-implemented method 500 may further include querying in bulk from a time series data store 206 a set of historical data stored during the duration, as at block 506, and processing the set of historical data and the remaining hints that are not in the subset of hints to form a first set of processed data, as at block 508. The computer-implemented method 500 may also include determining whether the first set of processed data exceeds the threshold parameter associated with the performance indicator, as at block 510, and performing an alert action in bulk based on the first set of processed data exceeding the threshold parameter of the performance indicator, the alert action indicative of a detection of the anomaly in the performance indicator, as at block 512.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A computer-implemented method for detecting an anomaly in a performance indicator associated with a network device, comprising:
   generating a plurality of hints, each hint resulting from an instance of the performance indicator exceeding a threshold parameter during a duration associated with the threshold parameter, and each hint including a plurality of parameters comprising at least a severity level;
   identifying a subset of hints from the plurality of hints, wherein each hint in the subset is associated with an open alert and has a same severity level as the associated open alert;
   querying in bulk from a time series data store a set of historical data stored during the duration;
   processing the set of historical data and remaining hints that are not in the subset of hints to form a first set of processed data;
   determining whether at least a portion of the first set of processed data exceeds the threshold parameter associated with the performance indicator; and
   performing an alert action in bulk based on the at least a portion of the processed data exceeding the threshold parameter of the performance indicator, the alert action indicative of a detection of the anomaly in the performance indicator.

2. The computer-implemented method of claim 1, further comprising:
   publishing the plurality of hints to a messaging queue; and
   retrieving the plurality of hints from the messaging queue via a streaming job running on a streaming engine.

3. The computer-implemented method of claim 2, wherein retrieving the plurality of hints from the messaging queue via the streaming job running on the streaming engine occurs on a periodic basis.

4. The computer-implemented method of claim 3, wherein the periodic basis is either thirty seconds or one minute.

5. The computer-implemented method of claim 2, further comprising:
   distributing the plurality of hints across a plurality of nodes in a notification system including the streaming engine to parallelize detection of the plurality of hints.

6. The computer-implemented method of claim 1, further comprising:
   receiving each instance of the performance indicator from the network device, and storing the instances of the performance indicator in the time series data store, the stored instances of performance indicators being the set of historical data stored during the duration.

7. The computer-implemented method of claim 1, wherein processing the set of historical data and the remaining hints that are not in the subset of hints to form the first set of processed data further comprises:
determining an average value of the set of historical data and the remaining hints;
determining a total value of the set of historical data and the remaining hints; or
determining a maximum value of the set of historical data and the remaining hints.

8. The computer-implemented method of claim 1, wherein performing the alert action comprises at least one of creating a new alert and modifying an open alert.

9. The computer-implemented method of claim 8, further comprising:
querying each new alert and each open alert;
querying in bulk from the time series data store the set of historical data associated with the performance indicators of each new alert and each open alert;
processing the set of historical data to form a second set of processed data;
determining whether the second set of processed data exceeds the threshold parameter associated with the performance indicators of each open alert; and
closing in bulk any open alert not exceeding the threshold parameter.

10. A computing system comprising:
a network device;
a memory; and
one or more processors, communicatively coupled to the memory and the network device, wherein the memory stores instructions, that when executed by the one or more processors, cause the one or more processors to:
generate a plurality of hints, each hint resulting from an instance of performance indicator of the network device exceeding a threshold parameter during a duration associated with the threshold parameter, and each hint including a plurality of parameters comprising at least a severity level;
identify a subset of hints from the plurality of hints, wherein each hint in the subset is associated with an open alert and has a same severity level as the associated open alert;
query in bulk from a time series data store a set of historical data stored during the duration;
process the set of historical data and remaining hints that are not in the subset of hints to form a first set of processed data;
determine whether at least a portion of the first set of processed data exceeds the threshold parameter associated with the performance indicator; and
perform an action alert in bulk based on the at least a portion of the first set of processed data exceeding the threshold parameter of the performance indicator, the alert action indicative of a detection of the anomaly in the performance indicator.

11. The computing system of claim 10, wherein the memory stores instructions, that when executed by the one or more processors, further cause the one or more processors to:
publish the plurality of hints to a messaging queue; and
retrieve the plurality of hints from the messaging queue via a streaming job running on a streaming engine.

12. The computing system of claim 11, wherein retrieving the plurality of hints from the messaging queue via the streaming job running on the streaming engine occurs on a periodic basis.

13. The computing system of claim 11, wherein the memory stores instructions, that when executed by the one or more processors, further cause the one or more processors to:
distribute the plurality of hints across a plurality of nodes in the computing system to parallelize detection of the plurality of hints.

14. The computing system of claim 10, wherein the memory stores instructions, that when executed by the one or more processors, further cause the one or more processors to:
receive the instances of the performance indicator from the network device, and store the instances of the performance indicator in the time series data store, the stored instances of performance indicators being the set of historical data stored during the duration.

15. The computing system of claim 10, wherein the instructions that cause the one or more processors to process the historical data and the remaining hints that are not in the subset of hints to form the processed data further cause the one or more processors to:
determine an average value of the set of historical data and the remaining hints;
determine a total value of the set of historical data and the remaining hints; or
determine a maximum value of the set of historical data and the remaining hints.

16. The computing system of claim 10, wherein the instructions that cause the one or more processors to perform an action alert further cause the one or more processors to at least one of create a new alert and modify an open alert.

17. The computing system of claim 10, wherein the memory stores instructions, that when executed by the one or more processors, further cause the one or more processors to:
query each new alert and each open alert;
query in bulk from the time series data store the set of historical data associated with the performance indicators of each new alert and each open alert;
process the historical data to form a second set of processed data;
determine whether the second set of processed data exceeds the threshold parameter associated with the performance indicators of each new alert and each open alert; and
close in bulk any open alert not exceeding the threshold parameter.

18. A non-transitory computer-readable medium comprising computer executable instructions stored thereon that when executed by one or more processors, cause the one or more processors to:
generate a plurality of hints, each hint resulting from a performance indicator exceeding a threshold parameter during a duration associated with the threshold parameter, and each hint including a plurality of parameters comprising at least a severity level;
identify a subset of hints from the plurality of hints, wherein each hint in the subset is associated with an open alert and has a same severity level as the associated open alert;
query in bulk from a time series data store a set of historical data stored during the duration;

process the set of historical data and remaining hints that are not in the subset of hints to form a set of processed data;

determine whether at least a portion of the set of processed data exceeds the threshold parameter associated with the performance indicator; and perform an alert action in bulk based on the at least a portion of the set of processed data exceeding the threshold parameter of the performance indicator, the alert action indicative of a detection of the anomaly in the performance indicator.

19. The non-transitory computer-readable medium of claim 18, wherein the instructions, that when executed by the one or more processors, further cause the one or more processors to:

publish the plurality of hints to a messaging queue; and retrieve the plurality of hints from the messaging queue via a streaming job running on a streaming engine.

20. The non-transitory computer-readable medium of claim 19, wherein the instructions, that when executed by the one or more processors, further cause the one or more processors to:

distribute the plurality of hints across a plurality of nodes in a notification system including the streaming engine to parallelize detection of the plurality of hints.

* * * * *